United States Patent [19]

Kikkawa et al.

[11] Patent Number: 4,957,953
[45] Date of Patent: Sep. 18, 1990

[54] STABILIZED SYNTHETIC RESIN COMPOSITION

[75] Inventors: Kazumi Kikkawa; Hiroshi Takahashi, both of Saitama, Japan

[73] Assignee: Adeka Argus Chemical Co., Ltd., Tokyo, Japan

[21] Appl. No.: 278,189

[22] Filed: Nov. 30, 1989

[30] Foreign Application Priority Data

Dec. 11, 1987 [JP] Japan .................. 62-313843

[51] Int. Cl.⁵ .............................. C08K 5/34
[52] U.S. Cl. .................... 524/99; 524/100; 524/102; 524/103
[58] Field of Search ............ 524/99, 100, 102, 103

[56] References Cited

U.S. PATENT DOCUMENTS 4,426,472  1/1984  Berner ........................ 524/102
4,487,870  11/1984 Bartz ........................... 524/91
4,692,486  9/1987  Gugumus ..................... 524/102

Primary Examiner—Kriellion Morgan
Attorney, Agent, or Firm—Frishauf, Holtz, Goodman & Woodward

[57] ABSTRACT

A stabilized synthetic resin composition obtained by adding (1) 0.01 to 5 parts by weight of at least one monopiperidine compound represented by the following general formula (I):

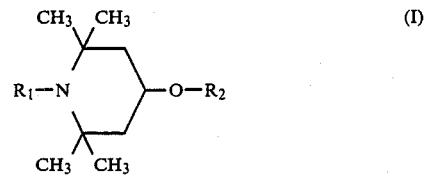

wherein
$R_1$ represents an alkyl group, an oxyl group or an acyl group, and
$R_2$ represents an aliphatic monoacyl group carrying 12 to 30 carbon atoms, and (2) 0.001 to 5 parts by weight of at least one polypiperidine compound having two or more tetramethylpiperidine groups represented by the following general formula (II) per molecule:

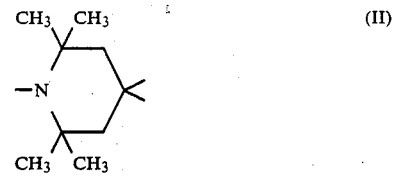

to 100 parts by weight of a synthetic resin.

15 Claims, No Drawings

STABILIZED SYNTHETIC RESIN COMPOSITION

BACKGROUND OF THE INVENTION

1. Field of the Invention:

This invention relates to a stabilized synthetic resin composition. More particularly, it relates to a stabilized synthetic resin composition comprising piperidyl ester(s) of an aliphatic monocarboxylic acid and polypiperidine compound(s).

2. Description of the Prior Art:

It has been known that synthetic resins including polyethylene, polypropylene, ABS and polyvinyl chloride resins are sensitive to ultraviolet light and that ultraviolet light would cause, for example, coloration or a decrease in the mechanical strengths of these resins, which makes the prolonged utilization of the same impossible.

Compounds which have been employed to prevent these troubles include benzophenones, benzotriazoles, benzoates and hindered amines. Recently hindered amines represented by polyalkylpiperidine compounds, among the abovementioned compounds, have attracted public attention, since they cause no coloration of resins and show relatively high photostabilizing effects.

Although hindered amines represented by piperidine compounds are relatively excellent as phostostabilizers, each of these compounds shows only limited effects when employed alone. Therefore it has been proposed to use a piperidine compound together with, for example, benzophenone, benzotriazole, phenyl salicylate or oxalic diamide ultraviolet absorbers. However the effect of the combined use of these materials is only additive so that it is unsatisfactory from a practical viewpoint.

Japanese Patent Laid-Open No. 79033/1983 has proposed addition of a stabilizer, which comprises a specific combination of a piperidine compound having a relatively low molecular weight and one having a relatively high molecular weight, to an organic polymer. However the effect thus obtained is likewise additive and thus considerably unsatisfactory in practice.

SUMMARY OF THE INVENTION

Under these circumstances, the present inventions have attempted to develop a stabilizer system capable of remarkably improving the weathering properties of a synthetic resin. As a result, they have found that the addition of a piperidyl ester of a long-chain aliphatic monocarboxylic acid together with a polypiperidine compound would bring about synergistic effects which are remarkably improved compared with those achieved by adding each material alone, thus completing the present invention.

Accordingly the present invention provides a stabilized synthetic resin composition which is obtained by adding (1) 0.001 to 5 parts by weight of at least one monopiperidine compound represented by the following general formula (I), and (2) 0.001 to 5 parts by weight of at least one polypiperidine compound having two or more tetramethylpiepridyl groups represented by the following general formula (II)

to 100 parts by weight of a synthetic resin:

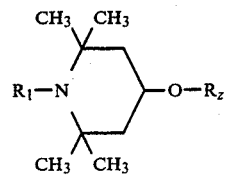

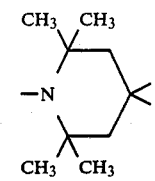

wherein $R_1$ represents a hydrogen atom, an alkyl group, an oxyl group or an acyl group, and $R_2$ represents an aliphatic monoacyl group carrying 12 to 30 carbon atoms.

The synthetic resin composition of the present invention is highly excellent in stability, in particular, weathering properties. It is further advantageous in that the high stability would never be lowered even in the presence of additives liable to adsorb stabilizers, for example, fillers and pigments.

DETAILED DESCRIPTION OF THE INVENTION

Examples of the $R_1$ group in the compound represented by the general formula (I), i.e., the component (1) of the stabilized synthetic resin composition according to the present invention include alkyl groups such as methyl, ethyl, propyl and butyl groups as well as acyl groups such as acetyl, propionyl, acryloyl and methacryloyl groups.

Thus examples of the compound (I) are as follows:

I-1: 2,2,6,6-tetramethyl-4-piperidyl laurate,
I-2: 2,2,6,6-tetramethyl-4-piperidyl myristate,
I-3: 2,2,6,6-tetramethyl-4-piperidyl palmitate,
I-4: 2,2,6,6-tetramethyl-4-piperidyl stearate,
I-5: 2,2,6,6-tetramethyl-4-piperidyl oleate,
I-6: 2,2,6,6-tetramethyl-4-piperidyl 12-hydroxystearate,
I-7: 2,2,6,6-tetramethyl-4-piperidyl behenate,
I-8: 1,2,2,6,6-pentamethyl-4-piperidyl stearate,
I-9: 1-acetyl-2,2,6,6-tetramethyl-4-piperidyl stearate, and
I-10: 1-oxyl-2,2,6,6-tetramethyl-4-piperidyl stearate.

The polypiperidine compound which is the component (2) of the stabilized synthetic resin composition according to the present invention has two or more 2,2,6,6-tetramethylpiperidyl groups per molecule. Examples thereof include esters or amide compounds obtained from an alcohol or an amine having piperidyl groups represented by the following general formula (II-a), (II-b) or (II-c), optionally together with other monohydric or polyhydric alcohol or amine, and a polycarboxylic acid or cyanuric acid; (co)polymers of an ester obtained from an alcohol having piperidyl groups represented by the following formula (II-a) or (II-b) and an unsaturated mono- or dicarboxylic acid, optionally together with other unsaturated monomers; condensates of bis(piperidyl)diamine represented by the following formula (II-d) and monosubstituted cyanuric chloride or a dihaloalkane; and polyester compounds of a dihydric alcohol having piperidyl groups represented by the following formula (II-e) and a dicarboxylic acid.

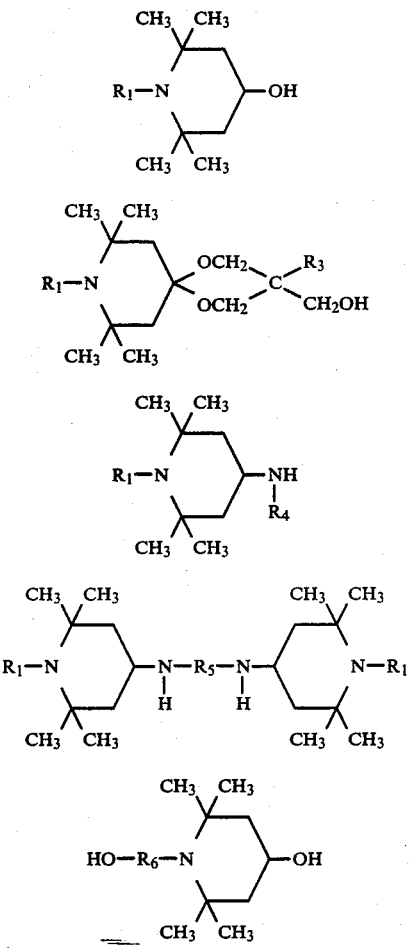

wherein
R₁ represents a hydrogen atom, an alkyl group, an oxyl group or an acyl group,
R₃ represents an alkyl group,
R₄ represents a hydrogen atom or an alkyl group, and
R₅ and R₆ represent each an alkylene group.

Therefore examples of the piperidine compound to be used in the present invention are as follows:

II-1: bis(2,2,6,6-tetramethyl-4-piperidyl) sebacate,
II-2: bis(1,2,2,6,6-pentamethyl-4-piperidyl) sebacate,
II-3: bis(1,2,2,6,6-pentamethyl-4-piperidyl) 2-butyl-2-(3',5'-di-tert-butyl-4'-hydroxybenzyl)malonate,
II-4: bis(1-acryloyl-2,2,6,6-tetramethyl-4-piperidyl)-2,2-bis(3',5'-di-tert-butyl-4'-hydroxybenzyl)malonate,
II-5: bis(9-aza-8,8,10.10-tetramethyl-3-ethyl-1,5-dioxaspiro[5.5]-3-undecylmethyl) sebacate,
II-6: tris(2,2,6,6-tetramethyl-4-piperidyl)citrate,
II-7: tris(2,2,6,6-tetramethyl-4-piperidyl)butanetricarboxylate,
II-8: tetrakis(2,2,6,6-tetramethyl-4-piperidyl)pyromellitate,
II-9: tetrakis(2,2,6,6-tetramethyl-4-piperidyl)1,2,3,4-butanetetracarboxylate,
II-10: tetrakis(1-acetyl-2,2,6,6-tetramethyl-4-piperidyl)1,2,3,4-butanetetracarboxylate,
II-11: tris(2,2,6,6-tetramethyl-4-piperidyl)mono(tridecyl)1,2,3,4-butanetetracarboxylate,
II-12: bis(2,2,6,6-tetramethyl-4-piperidyl)di(tridecyl)-1,2,3,4-butanetetracarboxylate,
II-13: bis(2,2,6,6-tetramethyl-1-oxyl-4-piperidyl)di(tridecyl) 1,2,3,4-butanetetracarboxylate,
II-14: tetrakis(1,2,2,6,6-pentamethyl-4-piperidyl) 1,2,3,4-butanetetracarboxylate,
II-15: tris(1,2,2,6,6-pentamethyl-2-piperidyl)mono(tridecyl) 1,2,3,4-butanetetracarboxylate,
II-16: bis(1,2,2,6,6-pentamethyl-4-piperidyl)di(tridecyl) 1,2,3,4-butanetetracarboxylate,
II-17: 3,9-bis[1,1-dimethyl-2-(tris(2,2,6,6-tetramethyl-4-piperidyloxycarbonyl)butylcarbonyloxy)ethyl]-2,4,8,10-tetraoxaspiro[5.5]undecane,
II-18: 3,9-bis[1,1-dimethyl-2-(tris(1,2,2,6,6-pentamethyl-4-piperidyloxycarbonyl)butylcarbonyloxy)ethyl]-2,4,8,10-tetraoxaspiro-[5.5]undecane,
II-19: 1,2,3,4-butanetetracarboxylic acid tetrakis(2,2,6,6-tetramethyl-4-piperidyl)amide,
II-20: 2-dibutylamino-4,6-bis(9-aza-8,8,10,10-tetramethyl-3-ethyl-1,5-dioxaspiro[5.5]-3-undecylmethoxy)-2-triazine,
II-21: 1,5,8,12-tetrakis[4,6-bis(N-(2,2,6,6-tetramethyl-4-piperidyl)butylamino)-1,3,5-triazin-2-yl]-1,5,8,12-tetraazadodecane,
II-22: 1,5,8,12-tetrakis[4,6-bis(N-(1,2,2,6,6-pentamethyl-4-piperidylbutylamino)-1,3,5-triazin-2-yl]-1,5,8,12-tetraazadodecane,
II-23: 2-tert-octylamino-4,6-dichloro-s-triazine/N,N'-bis(2,2,6,6-tetramethyl-4-piperidyl)hexamethylenediamine polycondensate,
II-24: 1,6-bis(2,2,6,6-tetramethyl-4-piperidylamino)hexane/dibromethane polycondensate,
II-25: 1-(2-hydroxyethyl)-2,2,6,6-tetramethyl-4-piperidinol/dimethyl succinate polycondensate,
II-26: poly(1,2,2,6,6-pentamethyl-4-piperidyl acrylate), and
II-27: poly[bis(1,2,2,6,6-pentamethyl-4-piperidyl) itaconate/vinyl butyl ether].

In the present invention, the component (1), i.e., the monopiperidine compound and the component (2), i.e., the polypiperidine compound may be used each in an amount of 0.001 to 5 parts by weight, preferably 0.01 to 3 parts by weight per 100 parts by weight of the synthetic resin.

Although the ratio between these components is not particularly restricted, it usually ranges from 1:10 to 10:1. It is particularly preferable that the total amount of these components ranges from 0.05 to 3 parts by weight per 100 parts by weight of the synthetic resin.

The stabilizer system of the present invention exhibits remarkably high stabilizing effects when added to a synthetic resin composition containing additives liable to adsorb stabilizers, for example, fillers and pigments. Thus it is suitable as a photostabilizer for compositions containing these additives.

Examples of the synthetic resin to be stabilized in the present invention include polyolefines and copolymers thereof including α-olefin polymers such as polyethylene, polypropylene, polybutene and poly-3-methylbutene, ethylene/vinyl acetate copolymer and ethylene/propylene copolymer; halogenated synthetic resins such as polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, vinyl chloride/vinyl acetate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride terpolymer, vinyl chloride/styrene/acrylonitrile terpolymer, vinyl chloride/butadiene copolymer, vinyl chloride/isoprene copolymer, vinyl chloride/chlorinated propylene copolymer, vinyl chloride/vinylidene chloride/vinyl acetate terpolymer, vinyl chloride/acrylate copolymer, vinyl chloride/maleate copolymer, vinyl chloride/methacrylate copolymer, vinyl chloride/acrylonitrile copolymer, internally plasticized polyvinyl chloride; petroleum resins, coumarone resin, polystyrene, polyvinyl acetate, acrylic resin, polyacrylonitrile, copolymers of styrene with other monomers such as maleic anhydride, butadiene and acrylonitrile, acrylonitrile/butadiene/styrene copolymer, acrylate/butadiene/styrene copolymer, methacrylate resins such as methacrylate/butadiene/styrene copolymer and polymethyl methacrylate, polyvinyl alcohol, polyvinyl formal, polyvinyl butyral, straight-chain polyester, polyphenylene oxide, polyamide, polycarbonate, polyacetal, polyurethane, cellulosic resins, phenol resins, urea resins, melamine resins, epoxy resins, unsaturated polyester resins and silicone resins. Further rubbers such as isoprene rubber, butadiene rubber, acrylonitrile/butadiene copolymer rubber and styrene/butadiene copolymer rubber as well as products obtained by blending these resins may be used in the present invention.

A known phenol antioxidant may be added to the composition of the present invention to thereby further improve the stability to oxidation of the same. Examples of the phenol antioxidant include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, thiodiethylene glycol bis[(3,5-di-tert-butyl-4-hydroxyphenyl) propionate], 4,4'-thiobis(6-tert-butyl-m-cresol), 2-octylthio-4,6-di(3',5'-dihydroxyphenoxy)-s-triazine, 2,2'-methylenebis(4-methyl-6-tert-butylphenol), 2,2'-methylenebis(4-ethyl-6-tert-butylphenol), bis[3,3-bis(4'-hydroxy-3'-tert-butylphenyl)-butyric acid] glycol ester, 4,4'-butylidenebis(6-tert-butyl-m-cresol), 2,2'-ethylidenebis(4,6-di-tertbutylphenol), 2,2'-ethylidenebis(4-sec-butyl-6-tert-butylphenol), 1,1,3-tris(2'-methyl-4'-hydroxy-5'-tert-butylphenyl)butane, bis[2-tertbutyl-4-methyl-6-(2'-hydroxy-3'-tert-butyl-5'-methylbenzyl)phenyl] terephthalate, 1,3,5-tris(2',6'-dimethyl-3'-hydroxy-4'-tert-butylbenzyl) isocyanurate, 1,3,5-tris(3',5'-di-tert-butyl-4'-hydroxybenzyl) isocyanurate, 1,3,5-tris(3',5'-di-tert-butyl-4'-hydroxybenzyl)-2,4,6-trimethylbenzene, 1,3,5-tris[(3',5'-di-tert-butyl-4'-hydroxyphenyl)propionyloxyethyl] isocyanurate, tetrakis[methylene-3-(3',5'-di-tert-butyl-4'-hydroxyphenyl) propionate]methane, 2-tert-butyl-4-methyl-6-(2'-acryloyloxy-3'-tert-butyl-5'-methylbenzyl)phenol, 3,9-bis(1',1'-dimethyl-2'-hydroxyethyl)-2,4,8,10-tetraoxaspiro[5,5]-undecanebis[β-(3'-tert-butyl-4'-hydroxy-5'-methylphenyl)-propionate], and triethylene glycol bis[β-(3-tert-butyl-4-hydroxy-5-methylphenyl)propionate].

A sulfur antioxidant may be added to the composition of the present invention to thereby further improve the stability to oxidation of the same. Examples of the sulfur antioxidant include dialkyl thiodipropionates such as dilauryl thiodipropionate, dimyristyl thiodipropionate and distearyl thiodipropionate and β-alkylmercaptopropionates of polyols such as pentaerythritol tetra(β-dodecylmercaptopropionate).

A phosphorus-containing compound may be added to the composition of the present invention to thereby further improve the light and heat resistance of the same. Examples of the phosphorus-containing compound include trisnonylphenyl phosphite, tris(2,4-di-tert-butylphenyl) phosphite, tridecyl phosphite, octyl diphenyl phosphite, di(decyl) monophneyl phosphite, di(tridecyl) pentaerythritiol diphosphite, distearyl pentaerythritol diphosphite, di(nonylphenyl) pentaerythritol diphosphite, bis(2,4-di-tert-butylphenyl) pentaerythritol diphosphite, bis(2,6-di-tert-butyl-4-methylphenyl) pentaerythritol diphosphite, tetra(tridecyl)isopropylidenediphenol diphosphite, tetra(tridecyl)-4,4'-n-butylidenebis(2-tert-butyl-5-methylphenol) diphosphite, hexa(tridecyl)-1,1,3-tris(3-(3'-tert-butyl-4'-hydroxy-5'-methylphenyl)butane) triphosphite and tetrakis(2,4-di-tert-butylphenyl) biphenylenediphosphonite.

An ultraviolet absorber may be added to the composition of the present invention to thereby further improve the light resistance of the same. Examples of the ultraviolet absorber include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2,2'-methylenebis(4-tert-octyl-6-benzotriazolyl)phenol; benzoates such as phenyl salicylate, resorcinol monobenzoate, 2,4-di-tert-butylphenyl 3',5'-di-tert-butyl-4'-hydroxybenzoate and hexadecyl 3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl α-cyano-β,β-diphenylacrylate and methyl 2-cyano-3-methyl-3-(p-methoxyphenyl)acrylate.

The composition of the present invention may further contain, for example, a heavy metal inactivator, a nucleating agent, a metal soap, an organotin compound, a plasticizer, an epoxy compound, a foaming agent, an antistatic agent, a fire retardant, a lubricant and a processing aid, if required.

To further illustrate the present invention, and not by way of limitation, the following Examples will be given.

EXAMPLE 1

Each composition as shown below was extruded at 250° C. to thereby give pellets. These pellets were injection molded at 250° C. into a test piece of 1 mm in thickness. The weathering properties of the same were evaluated with a Sunshine Weather-O-meter at a black panel temperature of 83° C. Table 1 shows the results.

| Composition: | parts by weight |
| --- | --- |
| polypropylene (Profax 6501) | 100 |
| n-octadecyl β-(4-hydroxy-3,5-di-tert-butylphenyl)propionate | 0.1 |
| calcium stearate | 0.05 |
| phthalocyanine blue | 0.3 |
| piperidine compound (cf. Table 1) | 0.3 |

TABLE 1

| No. | Piperidine compound | Light resistance (hr) |
|---|---|---|
| Ref. Ex. | | |
| 1-1 | comparative HALS cpd. *1 | 650 |
| 1-2 | cpd. I-4 | 750 |
| 1-3 | cpd. II-1 | 800 |
| 1-4 | cpd. II-9 | 850 |
| 1-5 | cpd. II-23 | 800 |
| 1-6 | comparative HALS cpd. (0.1) cpd. II-23 (0.2) | 750 |
| 1-7 | cpd. II-1 (0.1) cpd. II-23 (0.2) | 800 |
| Ex. | | |
| 1-1 | cpd. I-1 (0.1) cpd. II-9 (0.2) | 1050 |
| 1-2 | cpd. I-4 (0.1) cpd. II-1 (0.2) | 1050 |
| 1-3 | cpd. I-4 (0.05) cpd. II-9 (0.25) | 1000 |
| 1-4 | cpd. I-4 (0.1) cpd. II-9 (0.2) | 1150 |
| 1-5 | cpd. I-4 (0.2) cpd. II-9 (0.1) | 1100 |
| 1-6 | cpd. I-4 (0.1) cpd. II-14 (0.2) | 1250 |
| 1-7 | cpd. I-4 (0.1) cpd. II-16 (0.2) | 1150 |
| 1-8 | cpd. I-4 (0.1) cpd. II-18 (0.2) | 1200 |
| 1-9 | cpd. I-4 (0.1) cpd. II-21 (0.2) | 1150 |
| 1-10 | cpd. I-4 (0.1) cpd. II-23 (0.2) | 1150 |
| 1-11 | cpd. I-4 (0.1) cpd. II-24 (0.2) | 1100 |
| 1-12 | cpd. I-4 (0.2) cpd. II-25 (0.1) | 950 |
| 1-13 | cpd. I-5 (0.2) cpd. II-9 (0.1) | 1100 |
| 1-14 | cpd. I-8 (0.1) cpd. II-9 (0.2) | 1150 |
| 1-15 | cpd. I-8 (0.1) cpd. II-18 (0.2) | 1250 |
| 1-16 | cpd. I-8 (0.1) cpd. II-23 (0.2) | 1200 |
| 1-17 | cpd. I-9 (0.1) cpd. II-9 (0.2) | 1050 |
| 1-18 | cpd. I-10 (0.1) cpd. II-9 (0.2) | 1200 |

Note:
*1: 2,2,4,4-tetramethyl-7-oxa-3,20-diazabispiro-[5.1.11.2]heneicosan-21-one.

EXAMPLE 2

Test pieces of the following compositions were prepared in the same manner as the one described in Example 1 and the weathering properties of the same were evaluated with a Weather-O-meter. Table 2 shows the results.

| Composition: | parts by weight |
|---|---|
| polypropylene (Profax 6501) | 100 |
| n-octadecyl β-(4-hydroxy-3,5-di-tert-butylphenyl)propionate | 0.1 |
| calcium stearate | 0.05 |
| carbon black | 2.0 |
| piperidine compound (cf. Table 2) | 0.3 |

TABLE 2

| No. | Piperidine compound | Light resistance (hr) |
|---|---|---|
| Ref. Ex. | | |
| 2-1 | comparative HALS cpd. | 750 |
| 2-2 | cpd. I-4 | 800 |
| 2-3 | cpd. II-1 | 850 |
| 2-4 | cpd. II-9 | 900 |
| 2-5 | cpd. II-25 | 800 |
| 2-6 | comparative HALS cpd. (0.2) cpd. II-25 (0.1) | 800 |
| Ex. | | |
| 2-1 | cpd. I-4 (0.2) cpd. II-1 (0.1) | 1100 |
| 2-2 | cpd. I-4 (0.2) cpd. II-9 (0.1) | 1150 |
| 2-3 | cpd. I-4 (0.2) cpd. II-20 (0.1) | 1050 |
| 2-4 | cpd. I-4 (0.2) cpd. II-23 (0.1) | 1100 |
| 2-5 | cpd. I-4 (0.2) cpd. II-25 (0.1) | 1100 |
| 2-6 | cpd. I-4 (0.2) cpd. II-27 (0.1) | 1100 |
| 2-7 | cpd. I-8 (0.2) cpd. II-9 (0.1) | 1250 |
| 2-8 | cpd. I-8 (0.2) cpd. II-12 (0.1) | 1150 |
| 2-9 | cpd. I-8 (0.2) cpd. II-18 (0.1) | 1200 |
| 2-10 | cpd. I-8 (0.2) cpd. II-23 (0.1) | 1200 |
| 2-11 | cpd. I-9 (0.2) cpd. II-9 (0.1) | 1050 |
| 2-12 | cpd. I-10 (0.2) cpd. II-9 (0.1) | 1200 |

EXAMPLE 3

Test pieces of the following compositions were prepared in the same manner as the one described in Example 1 and the weathering properties of the same were evaluated with a Weather-O-meter. Table 3 shows the results.

| Composition: | parts by weight |
|---|---|
| polypropylene (Profax 6501) | 100 |
| n-octadecyl β-(4-hydroxy-3,5-di-tert-butylphenyl)propionate | 0.1 |
| calcium stearate | 0.05 |
| talc, food additive grade | 30 |
| polyazo red | 0.3 |
| piperidine compound (cf. Table 3) | 0.3 |

TABLE 3

| No. | Piperidine compound | Light resistance (hr) |
|---|---|---|
| Ref. Ex. | | |
| 3-1 | comparative HALS cpd. | 600 |
| 3-2 | cpd. I-4 | 750 |
| 3-3 | cpd. II-1 | 700 |
| 3-4 | cpd. II-23 | 800 |
| 3-5 | comparative HALS cpd. (0.1) cpd. II-23 (0.2) | 750 |
| Ex. | | |
| 3-1 | cpd. I-4 (0.1) cpd. II-1 (0.2) | 1050 |
| 3-2 | cpd. I-4 (0.1) cpd. II-2 (0.2) | 1100 |
| 3-3 | cpd. I-4 (0.1) cpd. II-9 (0.2) | 1200 |
| 3-4 | cpd. I-4 (0.1) cpd. II-14 (0.2) | 1100 |
| 3-5 | cpd. I-4 (0.1) cpd. II-18 (0.2) | 1200 |
| 3-6 | cpd. I-4 (0.1) cpd. II-23 (0.2) | 1250 |
| 3-7 | cpd. I-8 (0.1) | 1300 |

TABLE 3-continued

| No. | Piperidine compound | Light resistance (hr) |
|---|---|---|
| | cpd. II-23 (0.2) | 5 |

EXAMPLE 4

Each composition as shown below was extruded at 260° C. to give pellets, which were then injection molded at 260° C. into a test piece of 1 mm in thickness. The weathering properties of the obtained test piece were evaluated with a Sunshine Weather-O-meter at a black panel temperature of 83° C. without any rainfall. After irradiating for 400 hours, the color difference was examined. Table 4 shows the results.

| Composition | parts by weight |
|---|---|
| heat-resistance ABS resin (α-methyl-styrene content: 40%) | 100 |
| magnesium stearate | 0.4 |
| n-octadecyl β-(4-hydroxy-3,5-di-tert-butylphenyl)propionate | 0.2 |
| bis(2,4-di-tert-butylphenyl) pentaerythritol diphosphite | 0.2 |
| 2-(2'-hydroxy-3'-tert-butyl-5'-methylphenyl)-5-chlorophenylbenzotriazole | 0.4 |
| titanium dioxide | 0.5 |
| piperidine compound (cf. Table 4) | 0.3 |

TABLE 4

| No. | Piperidine compound | Color difference |
|---|---|---|
| Ref. Ex. | | |
| 4-1 | comparative HALS cpd. | 5.7 |
| 4-2 | cpd. I-4 | 5.3 |
| 4-3 | cpd. II-23 | 5.5 |
| 4-4 | comparative HALS cpd. (0.05) cpd. II-23 (0.25) | 5.5 |
| Ex. | | |
| 4-1 | cpd. I-4 (0.05) cpd. II-1 (0.25) | 3.4 |
| 4-2 | cpd. I-4 (0.05) cpd. II-9 (0.25) | 3.2 |
| 4-3 | cpd. I-4 (0.1) cpd. II-9 (0.2) | 3.5 |
| 4-4 | cpd. I-4 (0.2) cpd. II-9 (0.1) | 3.6 |
| 4-5 | cpd. I-4 (0.05) cpd. II-17 (0.25) | 3.3 |
| 4-6 | cpd. I-4 (0.05) cpd. II-23 (0.25) | 3.9 |
| 4-7 | cpd. I-8 (0.05) cpd. II-9 (0.25) | 3 0 |
| 4-8 | cpd. I-8 (0.05) cpd. II-18 (0.25) | 3.3 |
| 4-9 | cpd. I-8 (0.05) cpd. II-23 (0.25) | 3.8 |

What is claimed is:

1. A stabilized synthetic resin composition obtained by adding (1) 0.01 to 5 parts by weight of at least one monopiperidine compound represented by the following general formula (I):

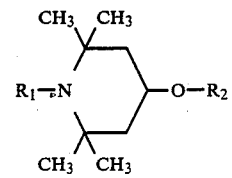

wherein $R_1$ represents an alkyl group, an oxyl group or an acyl group, and $R_2$ represents an aliphatic monoacyl group carrying 12 to 30 carbon atoms, and (2) 0.001 to 5 parts by weight of at least one polypiperidine compound having two or more tetramethylpiperidyl groups represented by the following general formula (II) per molecule:

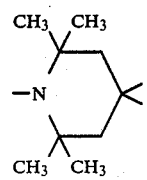

to 100 parts by weight of a synthetic resin.

2. The stabilized synthetic resin composition as set forth in claim 1, wherein said monopiperidine compound(s) and said polypiperidine compound(s) are used at a ratio by weight of 1:10 to 10:1.

3. The stabilized synthetic resin composition as set forth in claim 1, wherein the total content of said monopiperidine compound(s) and said polypiperidine compound(s) ranges from 0.05 to 3 parts by weight per 100 parts by weight of said synthetic resin.

4. The stabilized synthetic resin composition as set forth in claim 1, wherein the synthetic resin is polyolefin, copolymers of polyolefins, ABS or polyvinyl halide.

5. The stabilized synthetic resin as set forth in claim 1, wherein (a) the monopiperidine compound is 2,2,6,6-tetramethyl-4-piperidyl laurate, 2,2,6,6-tetramethyl-4-piperidyl myristate, 2,2,6,6-tetramethyl-4-piperidyl palmitate, 2,2,6,6-tetramethyl-4-piperidyl stearate, 2,2,6,6-tetramethyl-4-piperidyl oleate, 2,2,6,6-tetramethyl-4-piperidyl 12-hydroxy-stearate, 2,2,6,6-tetramethyl-4-piperidyl behenate, 1,2,2,6,6-pentamethyl-4-piperidyl stearate, 1-acetyl-2,2,6,6-tetramethyl-4-piperidyl stearate, and 1-oxy-2,2,6,6-tetramethyl-4-piperidyl stearate;

(b) the polypiperidine compound is bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl) 2-butyl-2-(3', 5'-di-tert-butyl-4'-hydroxybenzyl)malonate, bis(1-acryloyl-2,2,6,6-tetramethyl-4-piperidyl)-2,2-bis(3',5'-di-tert-butyl-4'-hydroxybenzyl)malonate, bis(9-aza-8,8,10.10-tetramethyl-3-ethyl-1,5-dioxaspiro (5.5)-3-undecylmethyl) sebacate, tris(2,2,6,6-tetramethyl-4-piperidyl)citrate, tris(2,2,6,6-tetramethyl-4-piperidyl)butanetricarboxylate, tetrakis(2,2,6,6-tetramethyl-4-piperidyl)pyromellitate, tetrakis(2,2,6,6-tetramethyl-4-piperidyl)1,2,3,4-butanetetracarboxylate, tetrakis(1-acetyl-2,2,6,6-tetramethyl-4-piperidyl)1,2,3,4-butanetetracarboxylate, tris(2,2,6,6-tetramethyl-4-piperidyl)-mono(tridecyl)1,2,3,4-butanetetracarboxylate, bis(2,2,6,6-tetramethyl-4-piperidyl)di(tridecyl)-1,2,3,4-butanetetracarboxylate, bis(2,2,6,6-tetramethyl-1-oxyl-4-piperidyl)di(tridecyl) 1,2,3,4-butanetetracarboxylate, tetrakis(1,2,2,6,6-pentamethyl-4-piperidyl) 1,2,3,4-butanetetracarboxylate, tris(1,2,2,6,6-pentamethyl-2-piperidyl)mono(tri-decyl) 1,2,3,4-butanetetracarboxylate, bis(1,2,2,6,6-pentamethyl-4-piperidyl)di(tridecyl) 1,2,3,4-butanetetracarboxylate, 3,9-bis(1,1-dimethyl-2-(tris(2,2,6,6-tetramethyl-4-piperidyloxycarbonyl)butylcarbonyloxy)ethyl)-2,4,8,10-tetraoxaspiro-5.5)undecane, 3,9-bis(1,1-dimethyl-2-(tris(1,2,2,6,6-pentamethyl-4-piperidyloxycarbonyl)butylcarbonyloxy)ethyl)-2,4,8,10-tetraoxaspiro-(5.5)undecane, 1,2,3,4-butanetetracarboxylic acid tetrakis(2,2,6,6-tetramethyl-4-piperidyl)amide, 2-dibutylamino-4,6-bis(9-aza-8,8,10,10-tetramethyl-3-ethyl-1,5-dioxaspiro(5.5)-3-undecylmethoxy)-2-triazine, 1,5,8,12-tetrakis]4,6-bis(N-(2,2,6,6-tetramethyl-4-piperidyl)butylamino)-1,3,5-triazin-2-yl]-1,5,8,12-tetraazadodecane, 1,5,8,12-tetrakis[4,6-bis(N-(1,2,2,6,6-pentamethyl-4-piperidylbutylamino)-1,3,5-triazin-2-yl]-1,5,8,12-tetraazadodecane, 2-tert-octylamino-4,6-dichloro-s-triazine/N,N'-bis(2,2,6,6-tetramethyl-4-piperidyl)-hexamethylenediamine polycondensate, 1,6-bis(2,2,6,6-tetramethyl-4-piperidylamino)hexane/-dibromethane polycondensate, 1-(2-hydroxyethyl)-2,2,6,6-tetramethyl-4-piperidinol/dimethyl succinate polycondensate, poly(1,2,2,6,6-pentamethyl-4-piperidyl acrylate), or poly[bis(1,2,2,6,6-pentamethyl-4-piperidyl) itaconate/vinyl butyl ether]; and (c) the synthetic resin is polyethylene, polypropylene, polybutene, poly-3-methylbutene, ethylene/vinyl acetate copolymer ethylene/propylene copolymer, polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, vinyl chloride/vinyl acetate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride terpolymer, vinyl chloride/styrene/acrylonitile terpolymer, vinyl chloride/butadiene copolymer, vinyl chloride/isoprene copolymer, vinyl chloride/chlorinated propylene copolymer, vinyl chloride/vinylidene chloride/vinyl acetate terpolymer, vinyl chloride/acrylate copolymer, vinyl chloride/maleate copolymer, vinyl chloride/methacrylate copolymer, vinyl chloride/acrylonitrile copolymer, internally plasticized polyvinyl chloride, petroleum resins, coumarone resin, polystyrene, polyvinyl acetate, acrylic resin, polyacrylonitrile; copolymers of styrene maleic anhydride, butadiene or acrylonitrile; acrylonitrile/butadiene/styrene copolymer, acrylate/butadiene/styrene copolymer, methacrylate/butadiene/styrene copolymer and polymethyl methacrylate, polyvinyl alcohol, polyvinyl formal, polyvinyl butyral, straight-chain polyester, polyphenylene oxide, polyamide, polycarbonate, polyacetal, polyurethane, cellulosic resins, phenol resins, urea resins, melamine resins, epoxy resins, unsaturated polyester resins and silicone resins, isoprene rubber, butadiene rubber, acrylonitrile/butadiene copolymer rubber or styrene/butadiene.

6. The stabilized synthetic resin composition as set forth in claim 5 wherein
   (a) the monopiperidine compound is 2,2,6,6-tetramethyl-4-piperidylstearate or 1,2,2,6,6-pentamethyl-4-piperidylstearate and
   (b) the polypiperidyl is bis(2,2,6,6-tetramethyl-4-piperidyl)sebacate, tetrakis(2,2,6,6-tetramethyl-4-piperidyl)-1,2,3,4-butane-2-tert-octylamino-4,6-dichloro-s-triazine/N,N'bis(2,2,6,6-tetramethyl-4-piperidyl)hexamethylenediamine polycon-densate.

7. The stabilized synthetic resin composition as set forth in claim 6, wherein the synthetic resin is polyolefin.

8. The stabilized synthetic resin composition as set forth in claim 6, wherein the synthetic resin is polypropylene or polyethylene.

9. The stabilized synthetic resin composition as set forth in claim 1, wherein the monopiperidine compound is 2,2,6,6-tetramethyl-4-piperidylstearate.

10. The stabilized synthetic resin composition as set forth in claim 1, wherein the monopiperidine compound is 1,2,2,6,6-pentamethyl-4-piperidylstearate.

11. The stabilized synthetic resin composition as set forth in claim 1, wherein the polypiperidine compound is bis(2,2,6,6-tetramethyl-4-piperidyl)sebacate.

12. The stabilized synthetic resin composition as set forth in claim 1, wherein the polypiperidine compound is tetrakis(2,2,6,6-tetramethyl-4-piperidyl)-1,2,3,4-butanetetracarboxylate.

13. The stabilized synthetic resin composition as set forth in claim 1, wherein the polypiperidine compound is 2-tert-octylamino-4,6-dichloro-s-triazine/N,N'-bis(2,2,6,6-tetramethyl-4-piperidyl)hexamethylenediamine polycondensate.

14. The stabilized synthetic resin composition as set forth in claim 1, wherein the synthetic resin is polyolefin.

15. The stabilized synthetic resin composition as set forth in claim 1, wherein the synthetic resin is polypropylene.

* * * * *